United States Patent
Yang et al.

(10) Patent No.: US 10,164,758 B2
(45) Date of Patent: Dec. 25, 2018

(54) READ-WRITE DATA TRANSLATION TECHNIQUE OF ASYNCHRONOUS CLOCK DOMAINS

(71) Applicant: Taiwan Semiconductor Manufacturing Co., Ltd., Hsinchu (TW)

(72) Inventors: Shu-Chun Yang, Changhua County (TW); Mu-Shan Lin, Hsinchu (TW); Wen-Hung Huang, Hsinchu (TW)

(73) Assignee: Taiwan Semicondcutor Manufacturing Co., Ltd. (TW)

(*) Notice: Subject to any disclaimer, the term of this patent is extended or adjusted under 35 U.S.C. 154(b) by 0 days.

(21) Appl. No.: 15/386,342

(22) Filed: Dec. 21, 2016

(65) Prior Publication Data

US 2018/0152279 A1    May 31, 2018

Related U.S. Application Data

(60) Provisional application No. 62/428,164, filed on Nov. 30, 2016.

(51) Int. Cl.
*H04L 7/02* (2006.01)
*H04L 7/00* (2006.01)

(52) U.S. Cl.
CPC .................. *H04L 7/0008* (2013.01)

(58) Field of Classification Search
CPC .......... G06F 13/1689; G06F 1/08; G06F 1/12; H04L 7/0008
See application file for complete search history.

(56) References Cited

U.S. PATENT DOCUMENTS 5,915,107 A * 6/1999 Maley ...................... G06F 1/12
                                                                713/400
8,405,442 B2   5/2013 Chen
(Continued)

FOREIGN PATENT DOCUMENTS

TW      201211766 A     3/2012
TW      201439714 A     10/2014
(Continued)

*Primary Examiner* — Shuwang Liu
*Assistant Examiner* — Sung Ahn
(74) *Attorney, Agent, or Firm* — Sterne, Kessler, Goldstein & Fox P.L.L.C.

(57) ABSTRACT

An electronic system includes transmitting circuitry of a first clock domain and receiving circuitry of a second domain. The transmitting circuitry re-times a digital input signal with rising edges of a clocking signal of the first clock domain when a phase of the clocking signal of the first clock domain leads a phase of a clocking signal associated with the digital input signal. Otherwise, the transmitting circuitry re-times the digital input signal with falling edges of the clocking signal of the first clock domain when the phase of the clocking signal of the first clock domain does not lead the phase of the clocking signal associated with a digital input signal. The receiving circuitry receives the re-timed digital input signal from the transmitting circuitry. Thereafter, the receiving circuitry re-times the re-timed digital input signal with rising edges of a phase of a clocking signal associated with the re-timed digital input signal when the phase of the clocking signal associated with the re-timed digital input signal leads a phase of a clocking signal of the second clock domain. Otherwise, the receiving circuitry re-times the re-timed digital input signal with falling edges of the phase of a clocking signal associated with the re-timed digital input signal when the phase of the clocking signal associated with the re-timed digital input signal does not lead the phase of a clocking signal of the second clock domain.

19 Claims, 7 Drawing Sheets

(56) References Cited

U.S. PATENT DOCUMENTS

| | | |
|---|---|---|
| 8,436,671 B2 | 5/2013 | Chern et al. |
| 8,610,488 B2 | 12/2013 | Yu et al. |
| 8,625,240 B2 | 1/2014 | Chung et al. |
| 8,713,277 B2 | 4/2014 | Lilly et al. |
| 8,847,659 B1 | 9/2014 | Lan et al. |
| 8,867,650 B2 | 10/2014 | Huang et al. |
| 9,164,134 B2 | 10/2015 | Dally et al. |
| 9,197,199 B2 | 11/2015 | Huang et al. |
| 9,214,933 B2 | 12/2015 | Chern et al. |
| 2014/0347941 A1* | 11/2014 | Jose .................. G11C 7/222 365/191 |

FOREIGN PATENT DOCUMENTS

| | | |
|---|---|---|
| TW | I462493 | 11/2014 |
| TW | I507694 | 11/2015 |

* cited by examiner

READ-WRITE DATA TRANSLATION TECHNIQUE OF ASYNCHRONOUS CLOCK DOMAINS

CROSS-REFERENCE TO RELATED APPLICATIONS

The present application claims the benefit of U.S. Provisional Patent Appl. No. 62/428,164, filed Nov. 30, 2016, which is incorporated herein by reference in its entirety.

BACKGROUND

An electronic system typically includes multiple integrated circuits that are formed onto multiple chips and/or dies. Often times, these multiple integrated circuits are not synchronized with one another. As such, these multiple integrated circuits can operate in accordance with their own clocking signals, referred to as clock domains. One or more electronic signals traversing among the multiple integrated circuits traverse between various clock domains of the multiple integrated circuits. This traversal between clock domains is referred to as a clock domain crossing, or simply a clock crossing.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
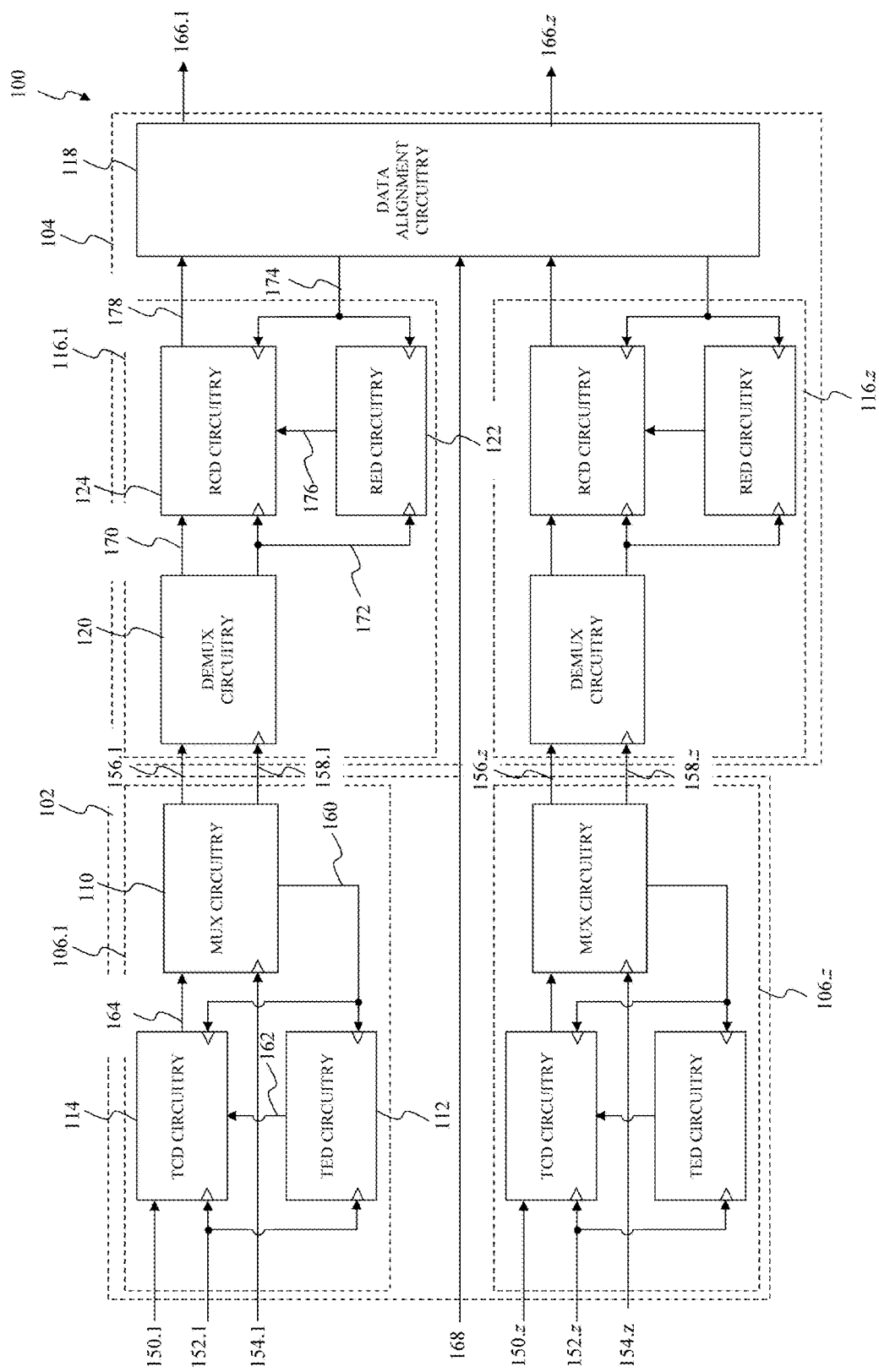
FIG. 1 is a block diagram of an exemplary electronic system in accordance with an exemplary embodiment of the present disclosure.

The following disclosure in various embodiments provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition does not in itself dictate a relationship between the various embodiments and/or configurations discussed.

Overview

Various embodiments of the present disclosure include transmitting circuitry of a first clock domain and receiving circuitry of a second clock domain. The transmitting circuitry re-times a digital input signal with rising edges of a clocking signal of the first clock domain when a phase of the clocking signal of the first clock domain leads a phase of a clocking signal associated with the digital input signal. Otherwise, the transmitting circuitry re-times the digital input signal with falling edges of the clocking signal of the first clock domain when the phase of the clocking signal of the first clock domain does not lead the phase of the clocking signal associated with the digital input signal. The receiving circuitry receives the re-timed digital input signal from the transmitting circuitry. Thereafter, the receiving circuitry re-times the re-timed digital input signal with rising edges of a phase of a clocking signal associated with the re-timed digital input signal when the phase of the clocking signal associated with the re-timed digital input signal leads a phase of a clocking signal of the second clock domain. Otherwise, the receiving circuitry re-times the re-timed digital input signal with falling edges of the phase of a clocking signal associated with the re-timed digital input signal when the phase of the clocking signal associated with the re-timed digital input signal does not lead the phase of a clocking signal of the second clock domain.

Exemplary Electronic System

FIG. 1 is a block diagram of an exemplary electronic system in accordance with an exemplary embodiment of the present disclosure. Electronic system 100 includes transmitting circuitry 102 that is formed onto one or more first chips and/or dies and receiving circuitry 104 that is formed onto one or more second chips and/or dies. Transmitting circuitry 102 represents a first digital circuit of a first clock domain and receiving circuitry 104 represents a second digital circuit of a second clock domain. One or more electronic signals sent by transmitting circuitry 102 and received by receiving circuitry 104 traverse between the first clock domain and the second clock domain. This traversal from the first clock domain to the second clock domain is referred to as a clock domain crossing (CDC), or simply a clock crossing. In this exemplary embodiment, receiving circuitry 104 re-times the one or more electronic signals received from transmitting circuitry 102 from the first clock domain to the second clock domain. This re-timing can include sampling of the one or more electronic signals received from transmitting circuitry 102 to be in the second clock domain. In an exemplary embodiment, the first clock domain and/or the second clock domain can include multiple first clock domains and multiple second clock domains, respectively. In this exemplary embodiment, transmitting circuitry 102 and/or receiving circuitry 104 re-time one or more electronic signals flowing though the multiple first clock domains and the multiple second clock domains, respectively.

Transmitting circuitry 102 includes transmitting cluster circuitry 106.1 through 106.z to re-time transmitting digital input signals 150.1 through 150.z to be in the first clock domain to provide transmitting digital output signals 156.1 through 156.z and corresponding transmitting output data clocking signals 158.1 through 158.z to receiving circuitry 104. In an exemplary embodiment, each of the transmitting digital input signals 150.1 through 150.z represents n multiple parallel digital signals that simultaneously, or near simultaneously, propagate through multiple lanes of a parallel data bus in parallel. In the exemplary embodiment of FIG. 1, each of transmitting cluster circuitry 106.1 through 106.z is implemented in a substantially similar manner; therefore, only transmitting cluster circuitry 106.1 is discussed in further detail. As such, transmitting cluster circuitry 106.1 includes multiplexing circuitry 110, transmitter-edge-detect (TED) circuitry 112, and transmitter-cross-domain (TCD) circuitry 114.

Multiplexing circuitry 110 provides a transmitting re-timing clocking signal 160 based upon a global transmitting clocking signal 154.1 from among global transmitting clocking signals 154.1 through 154.z. For example, multiplexing circuitry 110 can scale the global transmitting clocking signal 154.1 by a factor of n/2 to provide transmitting re-timing clocking signal 160 having a substantially similar frequency as transmitting clocking signal 152.1 but offset in phase from transmitting clocking signal 152.1.

TED circuitry 112 determines whether transmitting digital input signal 150.1 is to be re-timed with rising edges or falling edges of the transmitting re-timing clocking signal 160. As part of this determining, TED circuitry 112 compares a phase of transmitting clocking signal 152.1 with a phase of transmitting re-timing clocking signal 160. Thereafter, TED circuitry 112 provides a clocking signal selection 162 at a first logical level, such as a logical one for example, when the phase of transmitting clocking signal 152.1 is leading the phase of transmitting re-timing clocking signal 160. Otherwise, TED circuitry 112 provides clocking signal selection 162 at a second logical level, such as a logical zero for example, when the phase of transmitting clocking signal 152.1 is lagging the phase of transmitting re-timing clocking signal 160. In an exemplary embodiment, TED circuitry 112 compares rising and/or falling edges of transmitting clocking signal 152.1 with rising and/or falling edges of transmitting re-timing clocking signal 160 to determine whether transmitting clocking signal 152.1 is leading transmitting re-timing clocking signal 160 in phase. In some situations, TCD circuitry 114 can include hysteresis to delay the phase of transmitting re-timing clocking signal 160. This hysteresis provides necessary hold time and setup time for transmitting re-timing clocking signal 160 to allow TED circuitry 112 to compare the phase of transmitting clocking signal 152.1 and the phase of transmitting re-timing clocking signal 160 when small deviations are present between the phase of transmitting clocking signal 152.1 and the phase of transmitting re-timing clocking signal 160. In these situations, TED circuitry 112 compares the phase of transmitting clocking signal 152.1 and a phase delayed representation of transmitting re-timing clocking signal 160 when providing clocking signal selection 162.

TCD circuitry 114 re-times the n multiple parallel digital signals of transmitting digital input signal 150.1 in accordance with the rising and/or the falling edges of the transmitting re-timing clocking signal 160 based upon clocking signal selection 162 to provide n multiple parallel digital signals of a synchronized transmitting signal 164. In an exemplary embodiment, the synchronized transmitting signal 164 is synchronized with the first clock domain of transmitting circuitry 102. In another exemplary embodiment, TCD circuitry 114 re-times the n multiple parallel digital signals of transmitting digital input signal 150.1 in accordance with the falling edges of transmitting re-timing clocking signal 160 when clocking signal selection 162 is at the first logical level indicating that the phase of transmitting clocking signal 152.1 is leading the phase of transmitting re-timing clocking signal 160. In this exemplary embodiment, TCD circuitry 114 re-times the n multiple parallel digital signals of transmitting digital input signal 150.1 in accordance with the rising edges of transmitting re-timing clocking signal 160 when clocking signal selection 162 is at the second logical level indicating that the phase of transmitting clocking signal 152.1 is lagging the phase of transmitting re-timing clocking signal 160. In another exemplary embodiment, TCD circuitry 114 includes a rising edge signal processing path to re-time the n multiple parallel digital signals of transmitting digital input signal 150.1 in accordance with the rising edges of transmitting re-timing clocking signal 160 and a falling edge signal processing path to re-time the n multiple parallel digital signals of transmitting digital input signal 150.1 in accordance with transmitting re-timing clocking signal 160. In this exemplary embodiment, TCD circuitry 114 selects the falling edge signal processing path when clocking signal selection 162 is at the first logical level indicating that the phase of transmitting clocking signal 152.1 is leading the phase of transmitting re-timing clocking signal 160. Otherwise, TCD circuitry 114 selects the rising edge signal processing path when clocking signal selection 162 is at the second logical level indicating that the phase of transmitting clocking signal 152.1 is lagging the phase of transmitting re-timing clocking signal 160.

Multiplexing circuitry 110 also performs a parallel-to-serial conversion on synchronized transmitting signal 164 to convert the n multiple parallel digital signals of synchronized transmitting signal 164 to a serial signal in accordance with global transmitting clocking signal 154. For example, multiplexing circuitry 110 selects m-bits from each of the n multiple parallel digital signals of synchronized transmitting signal 164 using global transmitting clocking signal 154 and combines the m-bits selected from each of the n multiple parallel digital signals to each other to provide transmitting digital output signal 156.1. Multiplexing circuitry 110 thereafter provides transmitting digital output signal 156.1 and global transmitting clocking signal 154 as transmitting output data clocking signal 158.1 to receiving circuitry 104.

Still referring to FIG. 1, receiving circuitry 104 includes receiving cluster circuitry 116.1 through 116.z and data alignment circuitry 118 to re-time transmitting digital output signals 156.1 through 156.z to be in the second clock domain to provide a receiving digital output signals 166.1 through 166.z. In the exemplary embodiment of FIG. 1, each of receiving cluster circuitry 116.1 through 116.z is implemented in a substantially similar manner; therefore, only the receiving cluster circuitry 116.1 is discussed in further detail. As such, receiving cluster circuitry 116.1 includes demultiplexing circuitry 120, receiver-edge-detect (RED) circuitry 122, and receiver-cross-domain (RCD) circuitry 124.

Demultiplexing circuitry 120 performs a serial-to-parallel conversion on transmitting digital output signal 156.1 to convert the serial signal of transmitting digital output signal 156.1 into n multiple parallel digital signals in accordance with transmitting output data clocking signal 158.1 to provide a receiving digital input signal 170 and a receiving clocking signal 172.

RED circuitry 122 determines whether receiving digital input signal 170 is to be re-timed with rising edges or falling edges of retiming clocking signal 174. As part of this determining, RED circuitry 122 compares a phase of receiving clocking signal 172 with a phase of the receiving re-timing clocking signal 174. Thereafter, RED circuitry 122 provides a clocking signal selection 176 at a first logical level, such as a logical one for example, when the phase of receiving clocking signal 172 is leading the phase of the receiving re-timing clocking signal 174. Otherwise, RED circuitry 122 provides clocking signal selection 176 at a second logical level, such as a logical zero for example, when the phase of receiving clocking signal 172 is lagging the phase of receiving re-timing clocking signal 174. In an exemplary embodiment, RED circuitry 122 compares rising and/or falling edges of receiving clocking signal 172 with rising and/or falling edges of receiving re-timing clocking signal 174 to determine whether receiving clocking signal 172 is leading receiving re-timing clocking signal 174 in phase. In some situations, RCD circuitry 124 can include hysteresis to delay the phase of receiving re-timing clocking signal 174. This hysteresis provides necessary hold time and setup time for receiving re-timing clocking signal 174 to allow RED circuitry 122 to compare the phase of receiving clocking signal 172 and the phase of receiving re-timing clocking signal 174 when small deviations are present between the phase of receiving clocking signal 172 and the phase of receiving re-timing clocking signal 174. In these situations, RED circuitry 122 compares the phase of receiving clocking signal 172 and a phase delayed representation of receiving re-timing clocking signal 174 when providing clocking signal selection 176.

RCD circuitry 124 re-times the n multiple parallel digital signals of receiving digital input signal 170 in accordance with the rising and/or the falling edges of receiving re-timing clocking signal 174 based upon clocking signal selection 176 to provide n multiple parallel digital signals of a synchronized receiving signal 178 that is synchronized with the second clock domain of receiving circuitry 104. In an exemplary embodiment, RCD circuitry 124 re-times the n multiple parallel digital signals of receiving digital input signal 170 in accordance with the falling edges of the receiving re-timing clocking signal 174 when clocking signal selection 176 is at the first logical level indicating that the phase of receiving clocking signal 172 is leading the phase of receiving re-timing clocking signal 174. In this exemplary embodiment, RCD circuitry 124 re-times the n multiple parallel digital signals of receiving digital input signal 170 in accordance with the rising edges of receiving re-timing clocking signal 174 when clocking signal selection 176 is at the second logical level indicating that the phase of receiving clocking signal 172 is lagging the phase of receiving re-timing clocking signal 174. In another exemplary embodiment, RCD circuitry 124 includes a rising edge signal processing path to re-time the n multiple parallel digital signals of receiving digital input signal 170 in accordance with the rising edges of receiving re-timing clocking signal 174 and a falling edge signal processing path to re-time the n multiple parallel digital signals of receiving digital input signal 170 in accordance with receiving re-timing clocking signal 174. In this exemplary embodiment, RCD circuitry 124 selects the falling edge signal processing path when clocking signal selection 176 is at the first logical level indicating that the phase of receiving clocking signal 172 is leading the phase of receiving re-timing clocking signal 174. Otherwise, RCD circuitry 124 selects the rising edge signal processing path when clocking signal selection 176 is at the second logical level indicating that the phase of receiving clocking signal 172 is lagging the phase of receiving re-timing clocking signal 174.

Data alignment circuitry 118 aligns synchronized receiving signal 178 from each of receiving cluster circuitry 116.1 through 116.z to provide receiving digital output signals 166.1 through 166.z. In some situations, one or more symbols of synchronized receiving signals 178 from receiving cluster circuitry 116.1 through 116.z are not aligned with one another. In this situation, data alignment circuitry 118 adjusts one or more symbols of receiving cluster circuitry 116.1 through 116.z to align the one or more symbols of receiving cluster circuitry 116.1 through 116.z. Additionally, data alignment circuitry 118 provides receiving re-timing clocking signal 174 for each of receiving cluster circuitry 116.1 through 116.z based upon a global receiving clocking signal 168. For example, demultiplexing circuitry 120 can scale the output data clocking signal 158.1 through 158.z by a scale factor of $$\frac{n}{2}$$

to provide receiving clocking signal 172 for each of receiving cluster circuitry 116.1 through 116.z having a substantially similar frequency as its corresponding re-timing clocking signal 174 but offset in phase from its corresponding re-timing clocking signal 174.

Figure 2:
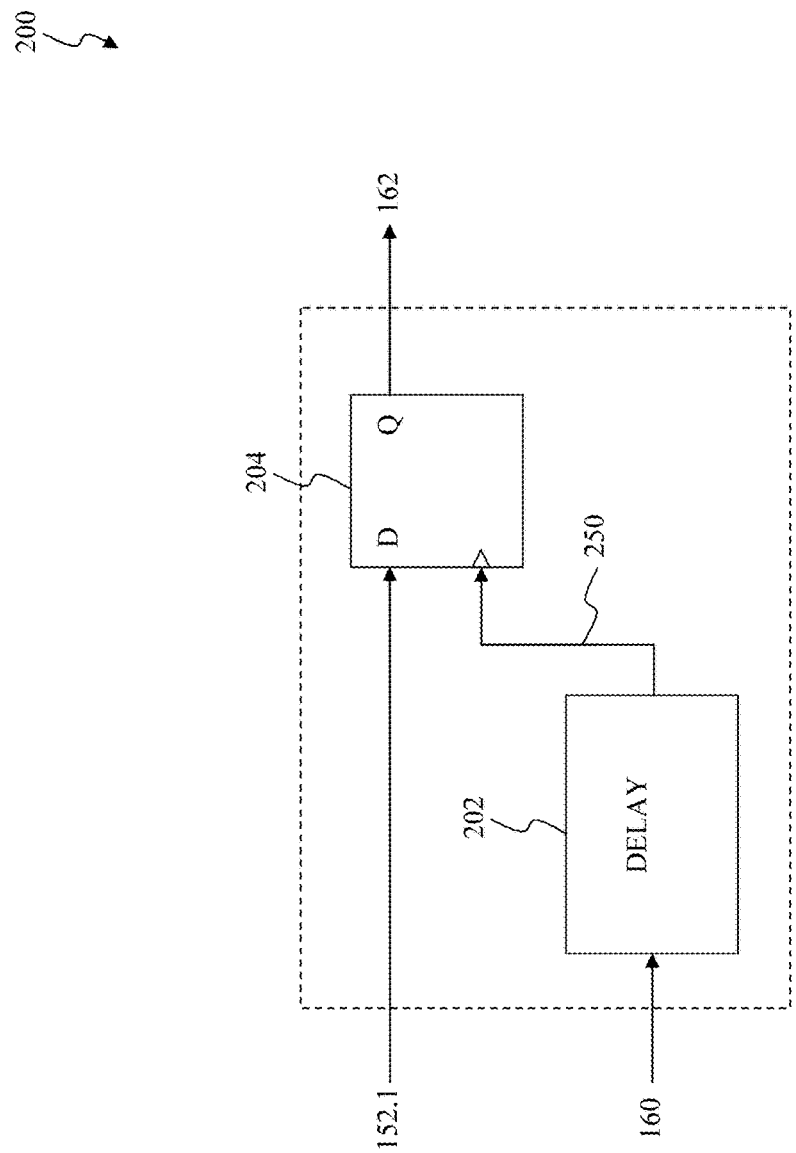
FIG. 2 illustrates exemplary transmitter-edge-detect (TED) circuitry that can be implemented within transmitting cluster circuitry of the exemplary electronic system in accordance with an exemplary embodiment of the present disclosure.
Figure 3:
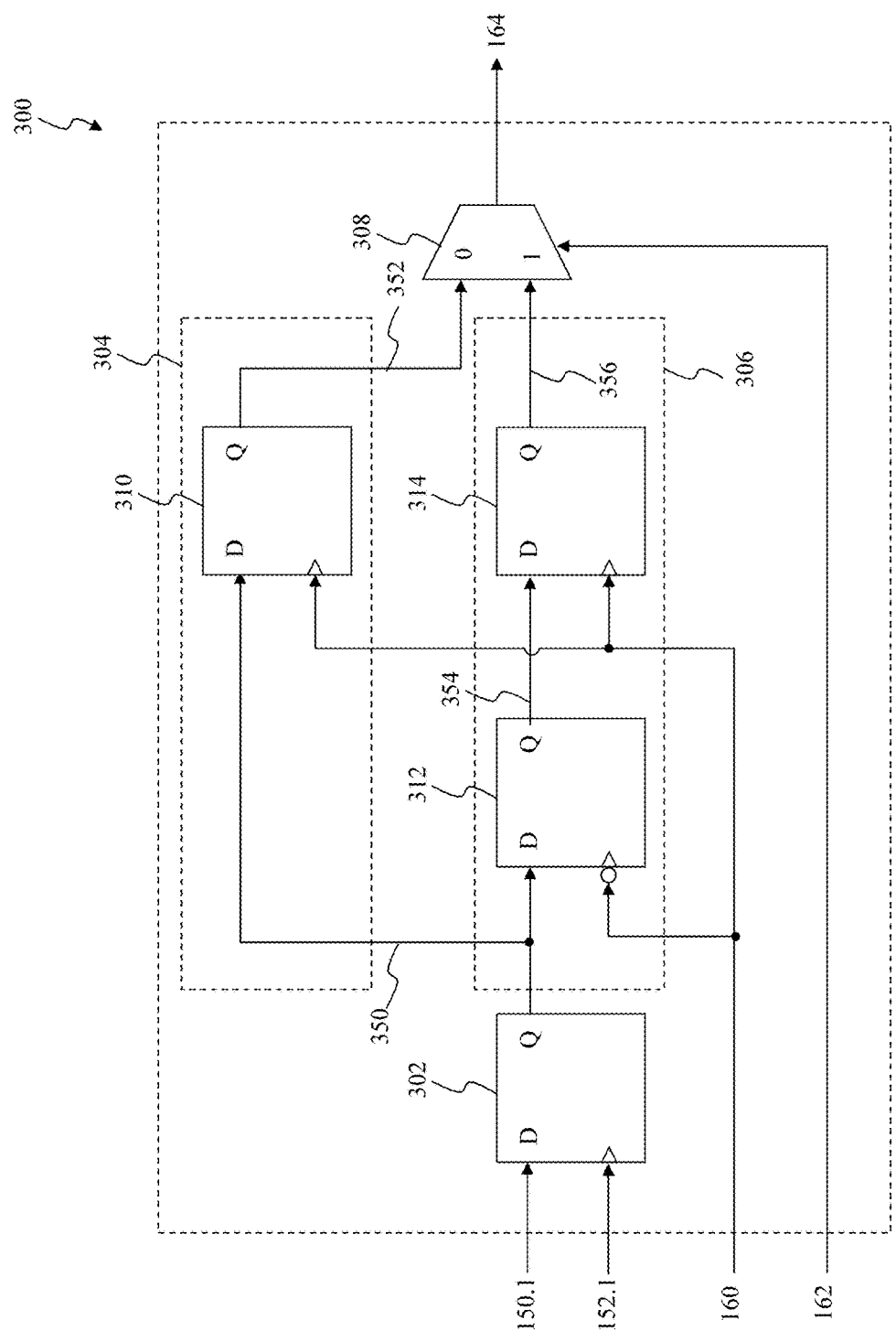
FIG. 3 is a schematic of exemplary transmitter-cross-domain (TCD) circuitry that can be implemented within transmitting cluster circuitry of the exemplary electronic system in accordance with an exemplary embodiment of the present disclosure.

Although the discussion of FIG. 2 and FIG. 3 to follow describes exemplary transmitter-edge-detect (TED) circuitry and exemplary transmitter-cross-domain (TCD) circuitry, respectively, those skilled in the relevant(s) will recognize that other embodiments are possible using other circuitry without departing from the spirit and scope of the present disclosure. This other circuitry can be characterized performing a substantially similar function as the exemplary transmitter-edge-detect (TED) circuitry and exemplary transmitter-cross-domain (TCD) circuitry as to be discussed in FIG. 2 and FIG. 3, respectively, as will be recognized by those skilled in the relevant(s) without departing from the spirit and scope of the present disclosure.

Exemplary Transmitter-Edge-Detect Circuitry

FIG. 2 illustrates exemplary transmitter-edge-detect (TED) circuitry that can be implemented within transmitting cluster circuitry of the exemplary electronic system in accordance with an exemplary embodiment of the present disclosure. TED circuitry 200 determines whether a transmitting digital input signal, such as transmitting digital input signal 150.1 for example, is to be re-timed with rising edges or falling edges of transmitting re-timing clocking signal 160. TED circuitry 200 includes digital delay circuitry 202 and a D-type flip-flop 204. TED circuitry 200 can represent an exemplary embodiment of TED circuitry 112.

Digital delay circuitry 202 provides hysteresis for TED circuitry 200 by delaying a phase of transmitting re-timing clocking signal 160 by a factor of DelayT to provide a delayed transmitting re-timing clocking signal 250. In an exemplary embodiment, the factor of DelayT can be determined by:

DelayT>$FF_{HT}$+margin−CK2Q 0.5T−DelayT>$FF_{ST}$+margin+CK2Q $0.5T > FF_{HT} + FF_{ST} + 2*\text{margin}$, where $FF_{HT}$ represents a hold time of a D-type flip-flop within transmitter-cross-domain (TCD) circuitry, margin represents a combination of the jitter, the duty distortion, and the skew of a signal with the TCD circuitry, CK2Q represents an output delay of the D-type flip-flop within TCD circuitry, and $FF_{ST}$ represents a set-up time of the D-type flip-flop within TCD circuitry.

D-type flip-flop 204 re-times transmitting clocking signal 152.1 in accordance with delayed transmitting re-timing clocking signal 250 to provide clocking signal selection 162. D-type flip-flop 204 provides clocking signal selection 162 at the first logical level, such as a logical one for example, upon a rising edge of delayed transmitting re-timing clocking signal 250 when transmitting clocking signal 152.1 is at the first logical level. This indicates the phase of transmitting clocking signal 152.1 is leading the phase of delayed transmitting re-timing clocking signal 250 by at least the factor of DelayT. Otherwise, D-type flip-flop 204 provides clocking signal selection 162 at the second logical level, such as a logical zero for example, upon the rising edge of delayed transmitting re-timing clocking signal 250 when transmitting clocking signal 152.1 is at the second logical level. This indicates the phase of transmitting clocking signal 152.1 is lagging the phase of delayed transmitting re-timing clocking signal 250 by at least the factor of DelayT.

Exemplary Transmitter-Cross-Domain Circuitry

FIG. 3 illustrates exemplary transmitter-cross-domain (TCD) circuitry that can be implemented within transmitting cluster circuitry of the exemplary electronic system in accordance with an exemplary embodiment of the present disclosure. TCD circuitry 300 re-times the n multiple parallel digital signals of transmitting digital input signal 150.1 in accordance with the rising and/or the falling edges of transmitting re-timing clocking signal 160 based upon clocking signal selection 162 to provide n multiple parallel digital signals of synchronized transmitting signal 164. TCD circuitry 300 includes a D-type flip-flop 302, a rising edge signal processing path 304, a falling edge signal processing path 306, and selection circuitry 308. TCD circuitry 300 can represent an exemplary embodiment of TCD circuitry 114.

D-type flip-flop 302 re-times transmitting digital input signal 150.1 in accordance with transmitting clocking signal 152.1 to provide a transmitting digital input signal 350. This re-timing of transmitting digital input signal 150.1 can be used to sharpen the edges of transmitting digital input signal 150.1 and/or align n multiple parallel digital signals of transmitting clocking signal 152.1 which can soften over time as transmitting digital input signal 150.1 is traversing to TCD circuitry 300.

Rising edge signal processing path 304 and falling edge signal processing path 306 re-time transmitting digital input signal 350 in accordance with rising edges and falling edges, respectively, of transmitting re-timing clocking signal 160. In the embodiment of FIG. 3, rising edge signal processing path 304 includes a D-type flip-flop 310 to re-time transmitting digital input signal 350 in accordance with the rising edges of transmitting re-timing clocking signal 160. D-type flip-flop 310 re-times transmitting digital input signal 350 in accordance with the rising edges of the transmitting re-timing clocking signal 160 to provide a re-timed rising edge transmitting digital input signal 352. D-type flip-flop 310 provides the re-timed rising edge transmitting digital input signal 352 at the first logical level, such as a logical one for example, upon a rising edge of the transmitting re-timing clocking signal 160 when transmitting digital input signal 350 is at the first logical level. Otherwise, D-type flip-flop 310 provides the re-timed rising edge transmitting digital input signal 352 at the second logical level, such as a logical zero for example, upon the rising edge of the transmitting re-timing clocking signal 160 when transmitting digital input signal 350 is at the second logical level.

Falling edge signal processing path 306 includes a D-type flip-flop 312 and a D-type flip-flop 314. As shown in FIG. 3, transmitting re-timing clocking signal 160 is inverted before being provided to D-type flip-flop 312. As such, D-type flip-flop 312 re-times transmitting digital input signal 350 in accordance with the falling edges of the transmitting re-timing clocking signal 160. D-type flip-flop 312 re-times transmitting digital input signal 350 in accordance with the falling edges of the transmitting re-timing clocking signal 160 to provide a re-timed falling edge transmitting digital input signal 354. D-type flip-flop 312 provides the re-timed falling edge transmitting digital input signal 354 at the first logical level, such as a logical one for example, upon a falling edge of the transmitting re-timing clocking signal 160 when transmitting digital input signal 350 is at the first logical level. Otherwise, D-type flip-flop 312 provides the re-timed falling edge transmitting digital input signal 354 at the second logical level, such as a logical zero for example, upon the falling edge of the transmitting re-timing clocking signal 160 when transmitting digital input signal 350 is at the second logical level.

D-type flip-flop 314 adjusts a phase of the re-timed falling edge transmitting digital input signal 354 to correspond with rising edges of transmitting re-timing clocking signal 160 to provide a re-timed falling edge transmitting digital input signal 356. D-type flip-flop 314 re-times the re-timed falling edge transmitting digital input signal 354 in accordance with the rising edges of transmitting re-timing clocking signal 160 to provide the re-timed falling edge transmitting digital input signal 356. D-type flip-flop 314 provides re-timed falling edge transmitting digital input signal 356 at the first logical level, such as a logical one for example, upon a rising edge of the transmitting re-timing clocking signal 160 when re-timed falling edge transmitting digital input signal 354 is at the first logical level. Otherwise, D-type flip-flop 314 provides re-timed falling edge transmitting digital input signal 356 at the second logical level, such as a logical zero for example, upon the rising edge of transmitting re-timing clocking signal 160 when re-timed falling edge transmitting digital input signal 354 is at the second logical level.

Selection circuitry 308 selects either re-timed rising edge transmitting digital input signal 352 or re-timed falling edge transmitting digital input signal 356 as synchronized transmitting signal 164 in response to clocking signal selection 162. When clocking signal selection 162 is at a first logical level, such as a logical one for example, selection circuitry 308 selects re-timed falling edge transmitting digital input signal 356 as synchronized transmitting signal 164. Otherwise, selection circuitry 308 selects re-timed rising edge transmitting digital input signal 352 as synchronized transmitting signal 164 when clocking signal selection 162 is at a second logical level, such as a logical zero for example.

Figure 4:
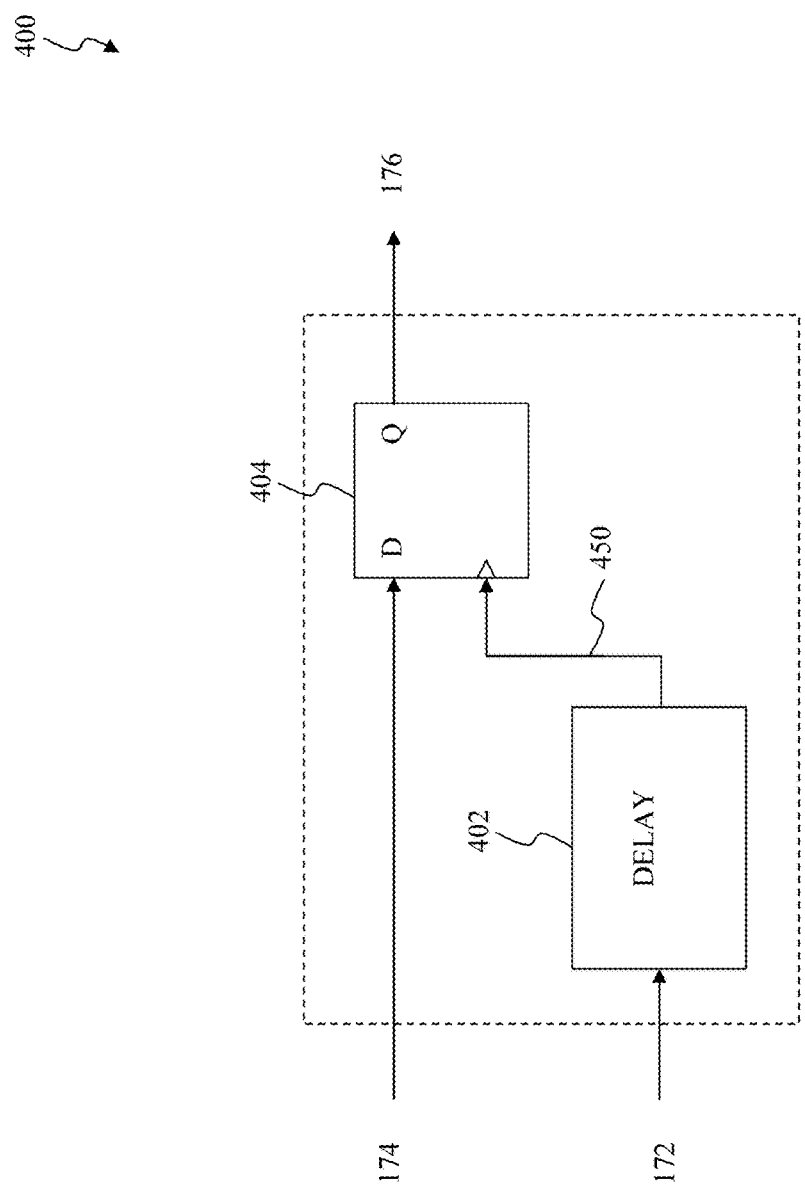
FIG. 4 illustrates exemplary receiver-edge-detect (RED) circuitry that can be implemented within receiving cluster circuitry of the exemplary electronic system in accordance with an exemplary embodiment of the present disclosure.
Figure 5:
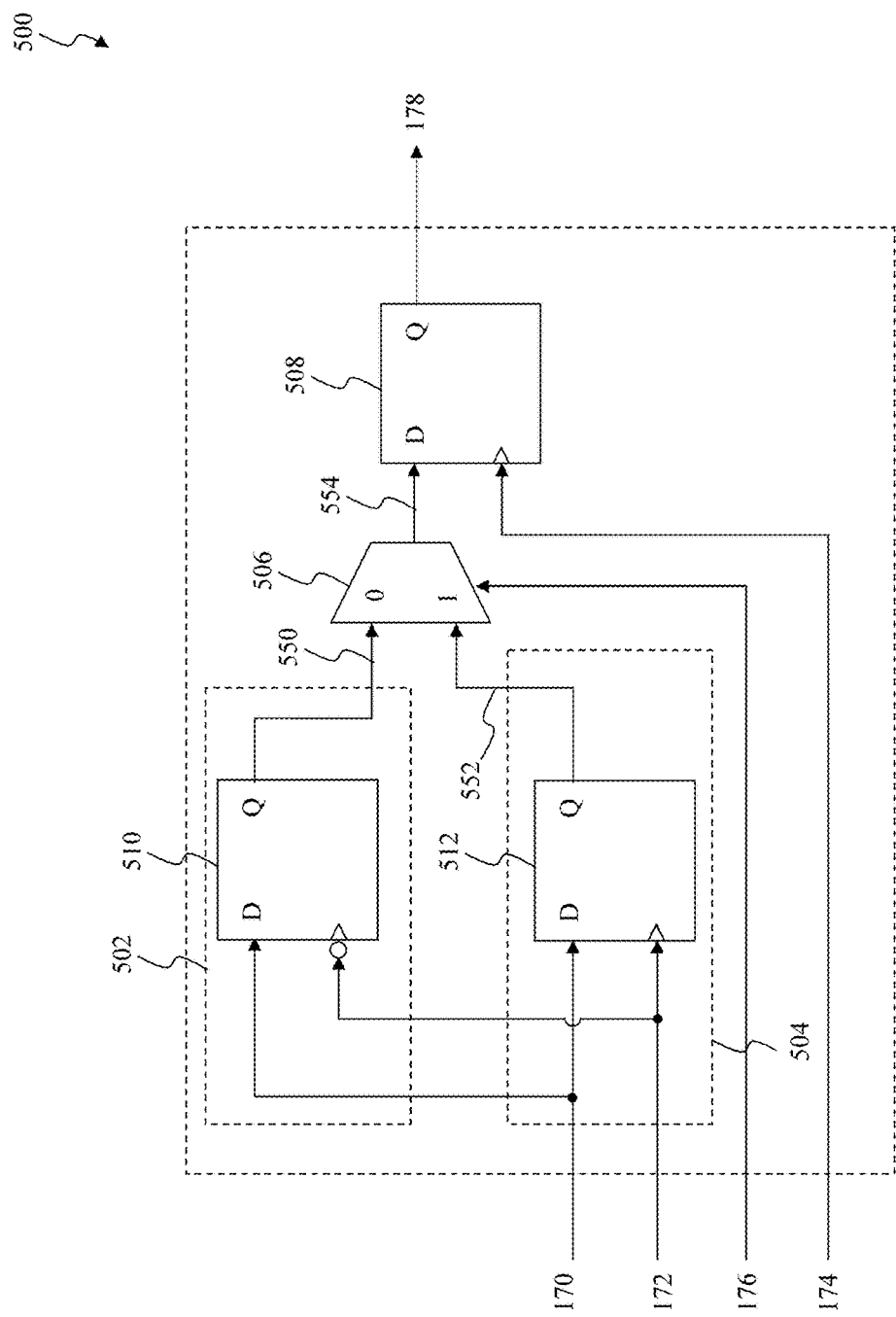
FIG. 5 illustrates exemplary receiver-cross-domain (RCD) circuitry that can be implemented within receiving cluster circuitry of the exemplary electronic system in accordance with an exemplary embodiment of the present disclosure.

Although the discussion of FIG. 4 and FIG. 5 to follow describes exemplary receiver-edge-detect (RED) circuitry and exemplary receiver-cross-domain (RCD) circuitry, respectively, those skilled in the relevant(s) will recognize that other embodiments are possible using other circuitry without departing from the spirit and scope of the present disclosure. This other circuitry can be characterized performing a substantially similar function as the exemplary receiver-edge-detect (RED) circuitry and exemplary receiver-cross-domain (RCD) circuitry as to be discussed in FIG. 4 and FIG. 5, respectively, as will be recognized by those skilled in the relevant(s) without departing from the spirit and scope of the present disclosure.

Exemplary Receiver-Edge-Detect

FIG. 4 illustrates exemplary receiver-edge-detect (RED) circuitry that can be implemented within receiving cluster circuitry of the exemplary electronic system in accordance with an exemplary embodiment of the present disclosure. RED circuitry 400 determines whether a receiving digital input signal, such as receiving re-timing clocking signal 174 as described above in FIG. 1 to provide an example, is to be re-timed with rising edges or falling edges of receiving clocking signal 172. RED circuitry 400 includes digital delay circuitry 402 and a D-type flip-flop 404. RED circuitry 400 can represent an exemplary embodiment of RED circuitry 122.

Digital delay circuitry 402 provides hysteresis for RED circuitry 400 by delaying a phase of receiving clocking signal 172 by the factor of DelayR to provide a delayed receiving re-timing clocking signal 450. The factor of DelayR can be determined in a substantially similar manner as the factor of DelayR as described in connection with FIG. 2, but in the context of:

$$\text{Delay}R > FF_{ST} + \text{margin} + CK2Q + \text{MUXDELAY}$$

$$0.5T - \text{Delay}R > FF_{HT} + \text{margin} - CK2Q + \text{MUXDELAY}$$

$$0.5T > FF_{HT} + FF_{ST} + 2*\text{margin},$$

where $FF_{ST}$ represents a setup time of a D-type flip-flop within receiver-cross-domain (RCD) circuitry, margin represents a combination of the jitter, the duty distortion, and the skew of signal data 554, CK2Q represents an output delay of D-type flip-flop within RCD circuitry, MUXDELAY represents an output delay of selection circuitry within RCD circuitry, and $FF_{HT}$ represents a hold time of D-type flip-flop within RCD circuitry.

D-type flip-flop 404 re-times re-timing clocking signal 174 in accordance with delayed receiving re-timing clocking signal 450 to provide clocking signal selection 176. D-type flip-flop 404 provides clocking signal selection 176 at the first logical level, such as a logical one for example, upon a rising edge of delayed receiving re-timing clocking signal 450 when re-timing clocking signal 174 is at the first logical level. This indicates the phase of re-timing clocking signal 174 is leading the phase of delayed receiving re-timing clocking signal 450 by at least the factor of DelayR. Otherwise, D-type flip-flop 404 provides clocking signal selection 176 at the second logical level, such as a logical zero for example, upon the rising edge of delayed receiving re-timing clocking signal 450 when re-timing clocking signal 174 is at the second logical level. This indicates the phase of re-timing clocking signal 174 is lagging the phase of delayed receiving re-timing clocking signal 450 by at least the factor of DelayR.

Exemplary Receiver-Cross-Domain Circuitry

FIG. 5 illustrates exemplary receiver-cross-domain (RCD) circuitry that can be implemented within receiving cluster circuitry of the exemplary electronic system in accordance with an exemplary embodiment of the present disclosure. RCD circuitry 500 re-times the n multiple parallel digital signals of receiving digital input signal 170 in accordance with the rising and/or the falling edges of receiving re-timing clocking signal 174 based upon clocking signal selection 176 to provide n multiple parallel digital signals of synchronized receiving signal 178. RCD circuitry 500 includes a falling edge signal processing path 502, a rising edge signal processing path 504, selection circuitry 506, and a D-type flip-flop 508. RCD circuitry 500 can represent an exemplary embodiment of RCD circuitry 124.

As shown in FIG. 5, falling edge signal processing path 502 and rising edge signal processing path 504 re-time receiving digital input signal 170 in accordance with rising edges and falling edges, respectively, of receiving clocking signal 172. In the embodiment of FIG. 5, falling edge signal processing path 502 includes a D-type flip-flop 510 to re-time receiving digital input signal 170 in accordance with the falling edges of receiving clocking signal 172 to provide a re-timed falling edge receiving digital input signal 550. As shown in FIG. 5, receiving clocking signal 172 is inverted before being provided to D-type flip-flop 510. As such, D-type flip-flop 510 re-times receiving digital input signal 170 in accordance with the falling edges of receiving clocking signal 172 to provide a re-timed falling edge receiving digital input signal 550. D-type flip-flop 510 provides re-timed falling edge receiving digital input signal 550 at the first logical level, such as a logical one for example, upon a falling edge of receiving clocking signal 172 when receiving digital input signal 170 is at the first logical level. Otherwise, D-type flip-flop 510 provides re-timed falling edge receiving digital input signal 550 at the second logical level, such as a logical zero for example, upon the falling edge of receiving clocking signal 172 when receiving digital input signal 170 is at the second logical level.

Rising edge signal processing path 504 includes a D-type flip-flop 512 to re-time receiving digital input signal 170 in accordance with the rising edges of receiving clocking signal 172 to provide a re-timed rising edge receiving digital input signal 552. D-type flip-flop 512 provides re-timed rising edge receiving digital input signal 552 at the first logical level, such as a logical one for example, upon a rising edge of receiving clocking signal 172 when receiving digital input signal 170 is at the first logical level. Otherwise, D-type flip-flop 512 provides re-timed rising edge receiving digital input signal 552 at the second logical level, such as a logical one for example, upon the rising edge of receiving clocking signal 172 when receiving digital input signal 170 is at the second logical level.

Selection circuitry 506 selects re-timed falling edge receiving digital input signal 550 or re-timed rising edge receiving digital input signal 552 as a synchronized receiving signal 554 in response to clocking signal selection 176. When clocking signal selection 176 is at a first logical level, such as a logical zero for example, selection circuitry 506 selects re-timed falling edge receiving digital input signal 550 as synchronized receiving signal 554. Otherwise, selection circuitry 506 selects re-timed rising edge receiving digital input signal 552 as synchronized receiving signal 554 when clocking signal selection 176 is at a second logical level, such as a logical one for example.

D-type flip-flop 508 adjusts a duty cycle of synchronized receiving signal 554 to correspond with receiving re-timing clocking signal 174 to provide synchronized receiving signal 178. D-type flip-flop 508 re-times synchronized receiving signal 554 in accordance with rising edges of receiving re-timing clocking signal 174 to provide the synchronized receiving signal 178. D-type flip-flop 508 provides synchronized receiving signal 178 at the first logical level, such as a logical one for example, upon a rising edge of receiving re-timing clocking signal 174 when synchronized receiving signal 554 is at the first logical level. Otherwise, D-type flip-flop 508 provides synchronized receiving signal 178 at the second logical level, such as a logical zero for example, upon the rising edge of receiving re-timing clocking signal 174 when synchronized receiving signal 554 is at the second logical level.

Although the exemplary embodiments illustrated FIGS. 3-5 use various D-type flip-flops, those skilled in the relevant art(s) will recognize these exemplary embodiments can be implemented differently using other types of flip-flops and/or circuits without departing from the spirit and scope of the present disclosure. These other types of flip-flops can include set-reset (SR) flip-flops, JK flip-flops, or toggle (T) flip-flops to provide some examples.

Exemplary Operation of the Exemplary Electronic System

Figure 6:
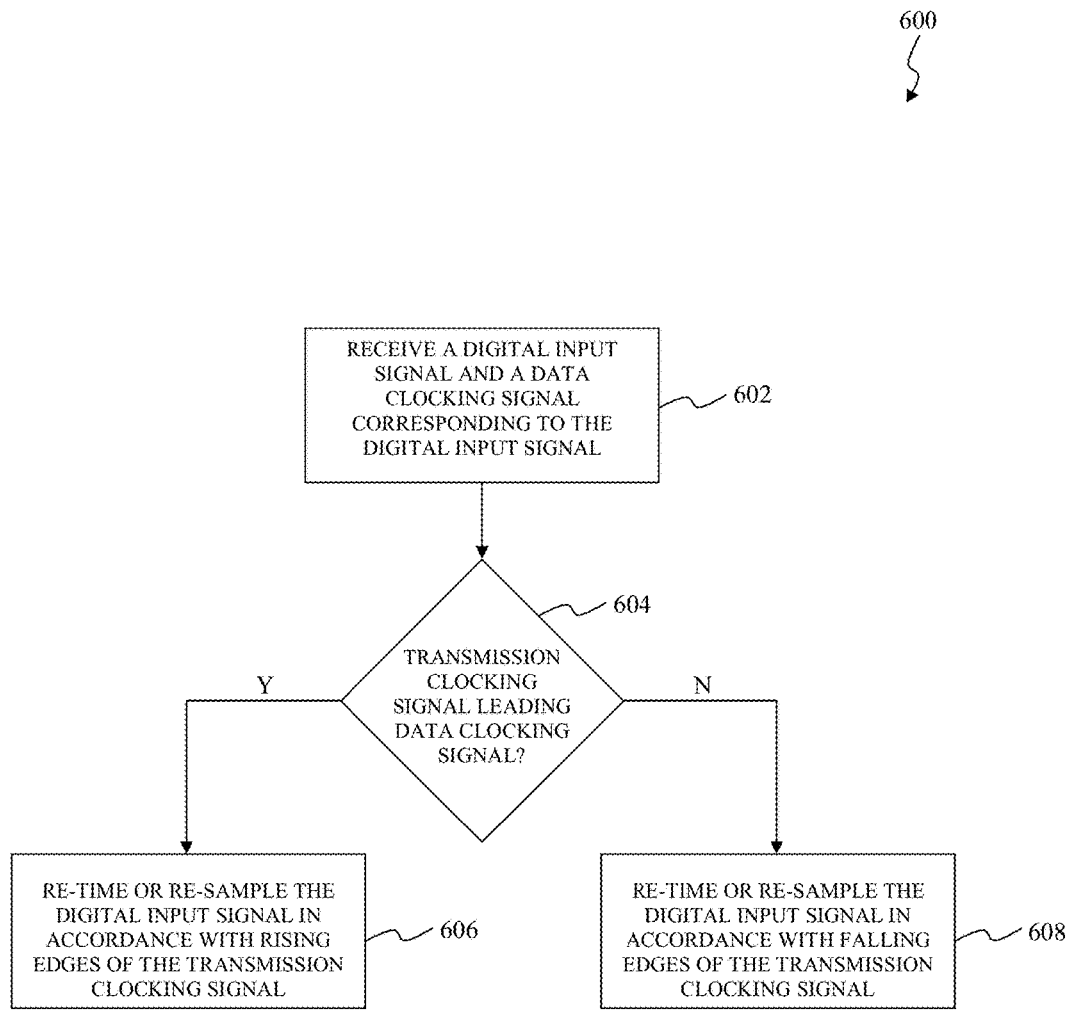
FIG. 6 is a flowchart of an exemplary control flow of transmitter circuitry within the exemplary electronic system in accordance with an exemplary embodiment of the present disclosure.

FIG. 6 is a flowchart of an exemplary control flow of transmitter circuitry within the exemplary electronic system in accordance with an exemplary embodiment of the present disclosure. The disclosure is not limited to this control flow. Rather, it will be apparent to persons of ordinary skill in the relevant art(s) that other control flows are within the scope and spirit of the present disclosure. The following discussion describes an exemplary control flow 600 of transmitter circuitry within the exemplary electronic system, such as transmitting circuitry 102 for example.

At operation 602, control flow 600 receives a digital input signal, such as one or more of transmitting digital input signals 150.1 through 150.z and a data clocking signal, such as one or more of the transmitting clocking signals 152.1 through 152.z, corresponding to the digital input signal.

At operation 604, control flow 600 determines whether a phase of a transmission clocking signal, such as transmitting re-timing clocking signal 160 for example, is leading a phase of the data clocking signal of operation 602. If the phase of the transmission clocking signal is leading the phase of the data clocking signal of operation 602, the operational control flow 600 proceeds to step 606. Otherwise, control flow 600 proceeds to operation 608 when the phase of the transmission clocking signal is not leading the phase of the data clocking signal of operation 602.

At operation 606, control flow 600 re-times the digital input signal from operation 602 in accordance with rising edges of the transmission clocking signal of operation 604 when the phase of the transmission clocking signal is leading the phase of the data clocking signal of operation 602.

At operation 608, control flow 600 re-times the digital input signal from operation 602 in accordance with falling edges of the transmission clocking signal of operation 604 when the phase of the transmission clocking signal is not leading the phase of the data clocking signal of operation 602.

Figure 7:
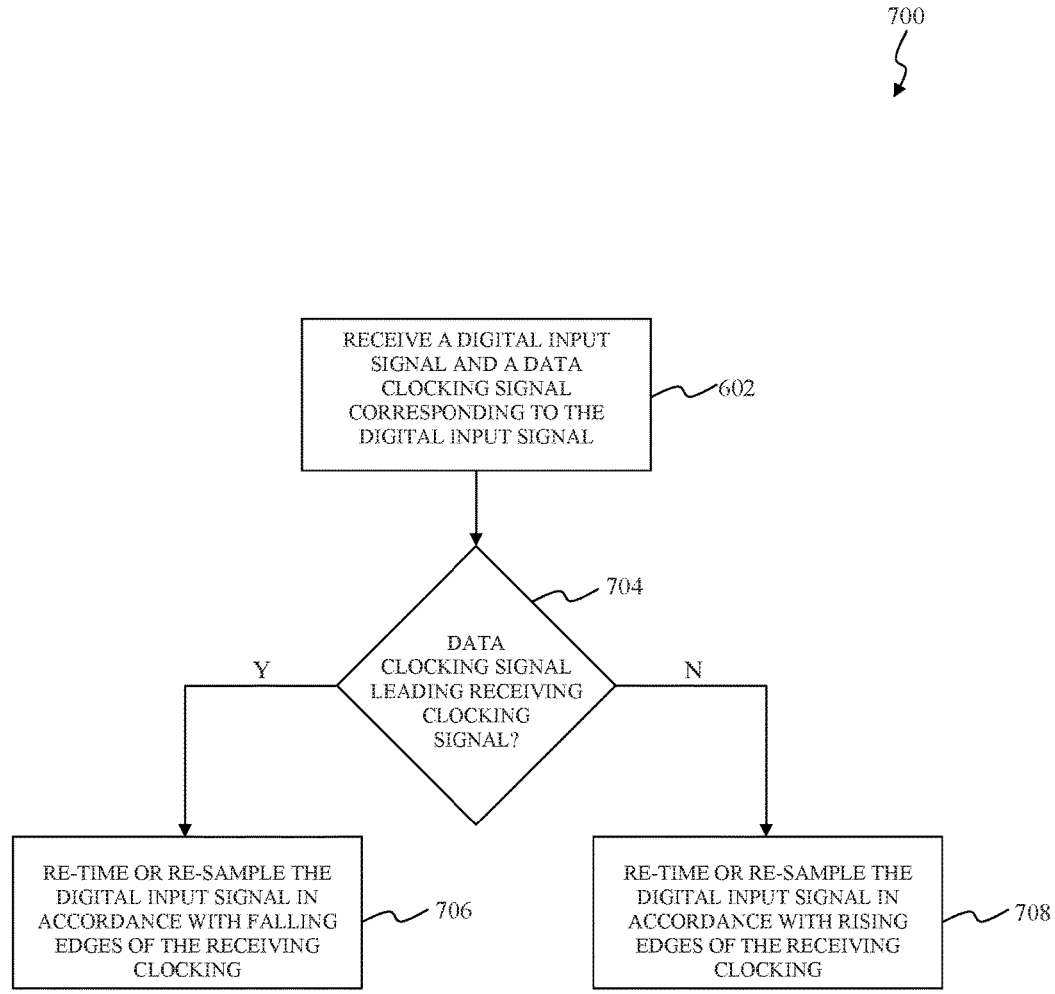
FIG. 7 is a flowchart of an exemplary control flow of receiver circuitry within the exemplary electronic system in accordance with an exemplary embodiment of the present disclosure.

FIG. 7 is a flowchart of an exemplary control flow of receiver circuitry within the exemplary electronic system in accordance with an exemplary embodiment of the present disclosure. The disclosure is not limited to this control flow. Rather, it will be apparent to persons of ordinary skill in the relevant art(s) that other control flows are within the scope and spirit of the present disclosure. The following discussion describes an exemplary control flow 700 of receiver circuitry within the exemplary electronic system, such as receiving circuitry 104 for example.

At operation 702, control flow 700 receives a digital input signal, such as one or more of transmitting digital output signals 156.1 through 156.z for example, and a data clocking signal, such as one or more of transmitting output data clocking signals 158.1 through 158.z for example, corresponding to the digital input signal.

At operation 704, control flow 700 determines whether a phase of the data clocking signal of operation 702 is leading a phase of a receiving clocking signal, such as receiving re-timing clocking signal 174 for example. If the phase of the data clocking signal of operation 702 is leading the phase of the receiving clocking signal, control flow 700 proceeds to operation 706. Otherwise, control flow 700 proceeds to operation 708 when the phase of the data clocking signal of operation 702 is not leading the phase of the receiving clocking signal.

At operation 706, control flow 700 re-times the digital input signal from operation 702 in accordance with rising edges of the receiving clocking signal of operation 704 when the phase of the data clocking signal of operation 702 is leading the phase of the receiving clocking signal of operation 704.

At operation 708, control flow 700 re-times the digital input signal from operation 702 in accordance with falling edges of the receiving clocking signal of operation 704 when the phase of the data clocking signal of operation 702 is not leading the phase of the receiving clocking signal of operation 704.

CONCLUSION

The foregoing Detailed Description discloses transmitting circuitry of a first clock domain, the transmitting circuitry including TED circuitry and TCD circuitry. The TED circuitry determines whether a digital input signal is to be re-timed with rising edges or falling edges of a clocking signal of the first clock domain and provides a clocking signal selection at a first logical level when the digital input signal is to be re-timed with the falling edges of the clocking signal of the first clock domain or at a second logical level when the digital input signal is to be re-timed with the rising edges of clocking signal of the first clock domain. The TCD circuitry re-times the digital input signal in accordance with the falling edges of the clocking signal of the first clock domain when clocking signal selection is at the first logical level and re-times the digital input signal in accordance with the rising edges of the clocking signal of the first clock domain when clocking signal selection is at the second logical level.

The foregoing Detailed Description discloses receiving circuitry of a first clock domain, the receiving circuitry including RED circuitry and RCD circuitry. The RED circuitry receives a digital input signal from transmitting circuitry of a first clock domain, determines whether the digital input signal is to be re-timed with rising edges or falling edges of a clocking signal associated with the digital input signal, and provides a clocking signal selection at a first logical level when the digital input signal is to be re-timed with the rising edges of the clocking signal associated with the digital input signal or at a second logical level when the digital input signal is to be re-timed with the falling edges of the clocking signal associated with the digital input signal. The RCD circuitry re-times the digital input signal in accordance with the rising edges of the clocking signal associated with the digital input signal when clocking signal selection is at the first logical level and re-times the digital input signal in accordance with the falling edges of the clocking signal associated with the digital input signal when clocking signal selection is at the second logical level.

The foregoing Detailed Description discloses a method for transmitting a digital signal between a first clock domain and a second clock domain. The method includes: determining, by a first circuit of the first clock domain, whether the digital input signal is to be re-timed with rising edges or falling edges of a clocking signal of the first clock domain; providing, by the first circuit of the first clock domain, a first clocking signal selection at a first logical level when the digital input signal is to be re-timed with the falling edges of the clocking signal of the first clock domain or at a second logical level when the digital input signal is to be re-timed with the rising edges of clocking signal of the first clock domain; re-timing, by the first circuit of the first clock domain, the digital input signal in accordance with the falling edges of the clocking signal of the first clock domain when the first clocking signal selection is at the first logical level; re-timing, by the first circuit of the first clock domain, the digital input signal in accordance with the rising edges of the clocking signal of the first clock when the first clocking signal selection is at the second logical level; receiving, by a second circuit of a second clock domain, the re-timed digital input signal; determining, by the second circuit of the second clock domain, whether the re-timed digital input signal is to be re-timed with rising edges or falling edges of a clocking signal associated with the re-timed digital input signal; providing, by the second circuit of the second clock domain, a second clocking signal selection at a first logical level when the re-timed digital input signal is to be re-timed with the rising edges of the clocking signal associated with the re-timed digital input signal or at a second logical level when the re-timed digital input signal is to be re-timed with the falling edges of the clocking signal associated with the re-timed digital input signal; re-timing, by the second circuit of the second clock domain, the re-timed digital input signal in accordance with the rising edges of the clocking signal associated with the re-timed digital input signal when the second clocking signal selection is at the first logical level; and re-timing, by the second circuit of the second clock domain, the re-timed digital input signal in accordance with the falling edges of the clocking signal associated with the re-timed digital input signal when the second clocking signal selection is at the second logical level.

The foregoing disclosure outlines features of several embodiments so that those of ordinary skill in the art may better understand the aspects of the present disclosure. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A transmitting circuitry of a first clock domain, the transmitting circuitry comprising:
   transmitter-edge-detect (TED) circuitry configured to:
      determine whether a digital input signal is to be re-timed with a rising edge or a falling edge of a clocking signal of the first clock domain, and
      provide a clocking signal selection at a first logical level when the digital input signal is to be re-timed with the falling edge when a phase of a second clocking signal associated with the digital input signal is lagging a phase of the clocking signal or at a second logical level when the digital input signal is to be re-timed with the rising edge when the phase of the second clocking signal is leading the phase of the clocking signal; and
   transmitter-cross-domain (TCD) circuitry configured to:
      re-time the digital input signal in accordance with the falling edge when the clocking signal selection is at the first logical level, and
      re-time the digital input signal in accordance with the rising edge when the clocking signal selection is at the second logical level.

2. The transmitting circuitry of claim 1, wherein the TED circuitry is further configured to determine the digital input signal is to be re-timed with the rising edge when the phase of the second clocking signal is leading the phase of the clocking signal by at least a delay factor.

3. The transmitting circuitry of claim 1, wherein the TED circuitry comprises:
   digital delay circuitry configured to delay the clocking signal by a delay factor to provide a delayed clocking signal of the first clock domain; and
   a flip-flop configured to re-time the second clocking signal in accordance with the delayed clocking signal to provide the clocking signal selection.

4. The transmitting circuitry of claim 1, wherein the TCD circuitry comprises:
   a flip-flop configured to re-time the digital input signal in accordance with the clocking signal to provide a re-timed digital input signal;
   a rising edge signal processing path configured to re-time the re-timed digital input signal in accordance with the rising edge to provide a re-timed rising edge digital input signal;
   a falling edge signal processing path configured to re-time the re-timed digital input signal in accordance with the falling edge to provide a re-timed falling edge digital input signal; and
   selection circuitry configured to select the re-timed falling edge digital input signal when the clocking signal selection is at the first logical level or the re-timed rising edge digital input signal when the clocking signal selection is at the second logical level.

5. The transmitting circuitry of claim 4, wherein the rising edge signal processing path comprises:
   a flip-flop configured to re-time the re-timed digital input signal in accordance with the rising edge to provide the re-timed rising edge digital input signal.

6. The transmitting circuitry of claim 4, wherein the falling edge signal processing path comprises:
   a first flip-flop configured to re-time the re-timed digital input signal in accordance with the failing edge to provide a falling edge digital input signal; and
   a second flip-flop configured to re-time the falling edge digital input signal in accordance with the rising edge to provide the re-timed falling edge digital input signal.

7. The transmitting circuitry of claim 4, further comprising:
   multiplexing circuitry configured to:
   perform a parallel-to-serial conversion on one of the selected re-timed falling edge digital input signal or the selected re-timed rising edge digital input signal to provide a transmitting digital output signal, and
   provide the transmitting digital output signal to receiving circuitry of a second clock domain.

8. A receiving circuitry of a first clock domain, the receiving circuitry comprising:
   receiver-edge-detect (RED) circuitry configured to:

receive a digital input signal from transmitting circuitry of a second clock domain,
determine whether the digital input signal is to be re-timed with a rising edge or a falling edge of a clocking signal of the first clock domain, and
provide a clocking signal selection at a first logical level when the digital input signal is to be re-timed with the rising edge or at a second logical level when the digital input signal is to be re-timed with the falling edge; and
receiver-cross-domain (RCD) circuitry configured to;
re-time the digital input signal in accordance with the rising edge when the clocking signal selection is at the first logical level, and
re-time the digital input signal in accordance with the falling edge when the clocking signal selection is at the second logical level.

9. The receiving circuitry of claim 8, wherein the RED circuitry is further configured to determine the digital input signal is to be re-timed with the falling edge when a phase of the clocking signal is leading a phase of a second clocking signal associated with the digital input signal.

10. The receiving circuitry of claim 9, wherein the RED circuitry is further configured to determine the digital input signal is to be re-timed with the falling edge when the phase of the clocking signal is leading the phase of the second clocking signal by at least a delay factor.

11. The receiving circuitry of claim 10, wherein the RED circuitry comprises:
digital delay circuitry configured to delay the clocking signal by the delay factor to provide a delayed clocking signal; and
a flip-flop configured to re-time the clocking signal in accordance with the delayed clocking signal to provide the clocking signal selection.

12. The receiving circuitry of claim 8, wherein the RCD circuitry comprises:
a rising edge signal processing path configured to re-time the digital input signal in accordance with the rising edge to provide a re-timed rising edge digital input signal;
a falling edge signal processing path configured to re-time the digital input signal in accordance with the falling edge to provide a re-timed falling edge digital input signal;
selection circuitry configured to select the re-timed rising edge digital input signal when the clocking signal selection is at the first logical level or the re-timed falling edge digital input signal when the clocking signal selection is at the second logical level; and
a flip-flop configured to re-time the selected re-timed falling edge digital input signal or the selected re-timed rising edge digital input signal in accordance with the clocking signal to provide a re-timed digital input signal.

13. The receiving circuitry of claim 12, wherein the rising edge signal processing path comprises:
a flip-flop configured to re-time the digital input signal in accordance with the rising edge to provide the re-timed rising edge digital input signal.

14. The receiving circuitry of claim 12, wherein the falling edge signal processing path comprises:
a flip-flop configured to re-time the digital input signal in accordance with the falling edge to provide the re-timed falling edge digital input signal.

15. A method for transmitting a digital signal between a first clock domain and a second clock domain, the method comprising:
determining, by a first circuit of the first clock domain, whether the digital input signal is to be re-timed with a rising edge or a falling edge of a first clocking signal of the first clock domain;
providing, by the first circuit of the first clock domain, a first clocking signal selection at a first logical level when the digital input signal is to be re-timed with the falling edge of the first clocking signal or at a second logical level when the digital input signal is to be re-timed with the rising edge of the first clocking signal;
re-timing, by the first circuit of the first clock domain, the digital input signal in accordance with the falling edge of the first clocking signal when the first clocking signal selection, is at the first logical level;
re-timing, by the first circuit of the first clock domain, the digital input signal in accordance with the rising edge of the first clocking signal when the first clocking signal selection is at the second logical level;
determining, by a second circuit of a second clock domain, whether the re-timed digital input signal is to be re-timed with a rising edge or a falling edge of a second clocking signal of the second clock domain;
providing, by the second circuit of the second clock domain, a second clocking signal selection at the first logical level when the re-timed digital input signal is to be re-timed with the rising edge of the second clocking signal or at the second logical level when the re-timed digital input signal is to be re-timed with the falling edge of the second clocking signal;
re-timing, by the second circuit of the second clock domain, the re-timed digital input signal in accordance with the rising edge of the second clocking signal when the second clocking signal selection is at the first logical level; and
re-timing, by the second circuit of the second clock domain, the re-timed digital input signal in accordance with the falling edge of the second clocking signal when the second clocking signal selection is at the second logical level.

16. The method of claim 15, wherein the determining whether the digital input signal is to be re-timed comprises:
determining the digital input signal is to be re-timed with the rising edge of the first clocking signal when a phase of a clocking signal associated with the digital input signal is leading a phase of the first clocking signal.

17. The method of claim 16, wherein the determining whether the digital input signal is to be re-timed further comprises:
determining the digital input signal is to be re-timed with the rising edge of the first clocking signal when the phase of the clocking signal associated with the digital input signal is leading the phase of the first clocking signal by at least a delay factor.

18. The method of claim 15, wherein the determining whether the re-timed digital input signal is to be re-timed comprises:
determining the digital input signal is to be re-timed with the rising edge of the second clocking signal when a phase of the second clocking signal is leading a phase of a third clocking signal of the second clock domain.

19. The method of claim 18, wherein the determining whether the re-timed digital input signal is to be re-timed further comprises:

determining the digital input signal is to be re-timed with the rising edge of the second clocking signal when the phase of the second clocking signal is leading the phase of the third clocking signal by at least a delay factor.

* * * * *